(12) United States Patent
Schile

(10) Patent No.: US 6,743,375 B2
(45) Date of Patent: Jun. 1, 2004

(54) EPOXY HARDENER OF IMIDAZOLE OR TRIHYDRIC COMPOUND WITH METHYLOL GROUPS, TRIMETHYLOLPROPANE AND TETRAMETHYLGUANIDINE (ADDUCT)

(75) Inventor: Richard D. Schile, Ridgefield, CT (US)

(73) Assignee: Ardes Enterprises, Inc., Ridgefield, CT (US)

( * ) Notice: Subject to any disclaimer, the term of this patent is extended or adjusted under 35 U.S.C. 154(b) by 105 days.

(21) Appl. No.: 09/683,984

(22) Filed: Mar. 8, 2002

(65) Prior Publication Data

US 2002/0082379 A1 Jun. 27, 2002

Related U.S. Application Data

(63) Continuation-in-part of application No. 09/714,043, filed on Nov. 16, 2000, now Pat. No. 6,491,845.

(51) Int. Cl.$^7$ .................. C08G 59/14; C08G 59/56; C08G 59/62
(52) U.S. Cl. .................. 252/183.11; 525/486; 525/523; 525/526; 528/110
(58) Field of Search .................. 252/182.26, 183.11; 525/486, 524, 523, 526; 528/110

(56) References Cited

U.S. PATENT DOCUMENTS

| 3,378,526 A | * | 4/1968 | Vogt et al. |
| 4,168,331 A | * | 9/1979 | Davis |
| 4,900,848 A | * | 2/1990 | Saito et al. .................. 549/517 |
| 6,225,439 B1 | * | 5/2001 | Amagai et al. ............. 528/380 |

FOREIGN PATENT DOCUMENTS

| JP | 62-174221 A | * | 7/1987 |

* cited by examiner

*Primary Examiner*—Robert Sellers
(74) *Attorney, Agent, or Firm*—Notaro & Michalos P.C.

(57) ABSTRACT

An epoxy resin hardener having a cure temperature of between about 60° C. and 100° C. comprises a mixture of:

a) an imidazole or a trihydric compound having methylol groups at the 2- and 6-positions formed by reacting a 4-alkylphenol with 2 moles of formaldehyde, b) trimethylopropane, and c) tetramethylguanidine or a tetramethylguanidine derived from the reaction of a monepoxide, a diepoxide, a phenol and formaldehyde, or a dihydric phenol and formaldehyde.

7 Claims, No Drawings

EPOXY HARDENER OF IMIDAZOLE OR TRIHYDRIC COMPOUND WITH METHYLOL GROUPS, TRIMETHYLOLPROPANE AND TETRAMETHYLGUANIDINE (ADDUCT)

CROSS-REFERENCE TO RELATED APPLICATIONS

This application is a continuation-in-part of U.S. patent application Ser. No. 09/714,043 filed on Nov. 16, 2000, now U.S. Pat. No. 6,491,845.

BACKGROUND OF THE INVENTION

The present invention relates generally to the field of epoxy hardeners and in particular to new and useful groupings of epoxy hardener compositions which rapidly cure an epoxy over a range of temperatures.

There are two general types of polymers; thermoplastic and thermosetting. Thermoplastic polymers melt on heating and solidify on cooling. They can be remelted and resolidified repeatedly within limits. Thermoplastics are commonly molded by injecting a hot, molten thermoplastic into a cold steel die and removing the part from the mold as soon as the part has cooled enough to prevent distortion. The high melt viscosity of thermoplastic resins requires very high injection pressures, commonly 10,000–20,000 p.s.i. and above. These high injection pressures require enormous clamping forces to hold the two halves of the die together and so part size is limited by the clamping capacity of the molding machine. High capital investment and large production runs are characteristic of thermoplastic molding processes.

Thermosetting polymers do not melt on heating. They soften only and, if heated sufficiently will char. Thermosetting resins such as epoxies are molded by either injecting or placing by hand a prepolymer mixture consisting of epoxy resin, hardener, catalyst and various modifiers and fillers into a mold and heating for a time sufficient to complete the chemical reactions between the epoxy resin and the hardener, resulting in a thermosetting polymer having the shape and size of the mold. Molding times are considerably longer than for thermoplastic molding processes, typically five to fifteen minutes. However, injection pressures are low and so the mold clamping forces needed are also low. Thus, thermoset molding processes are characterized by low production rates and relatively low capital investment. But, large part sizes are possible.

The curing reactions of epoxies are exothermic and cure times and temperatures are determined by the heat transfer rate from the mold to the part and the scorch temperature of the epoxy. Epoxy/hardener systems which cure at low temperatures and which develop low exotherm as a result of chemical factors are very advantageous since they can be cured faster and will result in higher production rates.

Epoxies are used extensively as thermosetting adhesives for bonding wood, glass, ceramics and metals. For hand application, the epoxy resin and hardener are usually supplied in two separate syringes which have a common plunger. Pressing the plunger releases the correct proportions of epoxy and hardener. The two compounds are mixed with a spatula and applied to the bonding surfaces and then cured either at room temperature or at elevated temperature, depending on the application. Epoxy hardeners which cure rapidly at low temperature develop higher bond strength due to lower shrinkage stresses and permit higher production rates with lower energy expenditure.

Epoxy adhesives are frequently used in industrial processes in the form of "film adhesive". A prepolymer mixture of epoxy, hardener, and other desired components is applied as a coating onto a polymer film substrate, rolled up and stored in a freezer to stop the chemical reactions between components. When needed, the film adhesive is removed from the freezer and applied to a metal or composite part, the backing is stripped off and the assembly completed and cured in an oven or autoclave.

At the point when the adhesive is removed from the freezer, the epoxy mixture begins to cure slowly at room temperature. After a certain time called the "out time", the adhesive will become stiff and brittle and unusable. Latent mixtures having long out times are highly desirable in order to complete complex assemblies before curing. Hardeners having very long out times, or latency, but with relatively low cure temperatures and short cure times are difficult to create, further increasing their value.

Epoxies are combined with fiberglass or carbon fiber in the manufacture of composite materials. These are used extensively in military and aerospace applications, civil aircraft, sporting goods such as fishing rods, golf club shafts, tennis rackets, bows and arrows and the like. These are manufactured either by automated processes or by hand layup. Epoxies which develop excellent strength and toughness after curing at room temperature or low temperature result in composite structures having superior properties, higher production rates and lower cost. The absence of noxious vapors from the epoxy-hardener mixture is of great benefit to persons who must handle these materials.

Another application involving composites is the use of composite tooling for formed sheet metal parts. These are practical for prototyping and short production runs as a substitute for metal tools. The completed tool must be strong and hard and must cure effectively at room temperature.

Epoxies are used extensively in the "potting" of electronic circuits which are exposed to shock, vibration, and rain, for example, for protection of the circuits. The circuit is assembled and placed in a case and the liquid epoxy mixture is poured into the case, thus enclosing the circuit components and isolating them from the atmosphere as well as protecting them from vibration and shock. These are used in automobile and truck engine computers, aircraft, tanks, missiles, etc. The epoxy mixture must have a low viscosity to fill the spaces around the components before hardening. A low cure temperature is desirable to protect the electronic circuits from heat damage and to limit shrinkage which stresses components and connections. The cured epoxy must be strong and tough to resist mechanical stresses and the cure rate should be rapid to realize a high production rate.

Electronic components are "encapsulated" by dipping them into an epoxy prepolymer mixture, draining off the excess resin and curing the coating. This protects the components from atmospheric exposure. A high cure rate at low temperature is desired to prevent heat damage, keep stresses low and achieve a high production rate.

Coating systems have been developed which are used to protect metal surfaces from rust and corrosion and to enhance appearance. These are used extensively in large appliances such as washing machines, dryers, refrigerator cases, large structures such as bridge beams and architectural applications. While epoxies have enjoyed a long period of success in these applications, they have been recently partially replaced by the tougher polyurethanes. Polyurethanes have some disadvantages such as sensitivity to the resin/hardener ratio and the isocyanate resin is itself susceptible to degradation from atmospheric moisture. Nevertheless, sophisticated metering and spraying equipment has been developed for these materials. Epoxy systems having superior strength and toughness after curing at low temperatures as well as relatively low sensitivity to the resin/hardener ratio and low toxicity may permit epoxy coating systems to regain some of their lost market share.

Prior art hardeners for epoxies are disclosed in art, such as in U.S. Pat. No. 3,812,202, which teaches a two part self-hardening epoxy composition which is formed by a phenol precursor combined with a methylol acrylic polymer. The phenol precursor is made by combining bisphenol A with a polyepoxide compound to create a composition having two or more phenolic groups. The methylol acrylic polymer can be formed by polymerizing acrylamide or diacetone acrylamide with other ethylenically unsaturated monomers, followed by adding an aldehyde, such as formaldehyde, and optionally, a catalyst. The, phenol precursor and methylol acrylic polymer are mixed to a desired viscosity, applied, and heated to at least about 300° F. to cure.

U.S. Pat. No. 4,866,133 discloses a curing agent for an epoxy containing a polymeric phenol and a polyamine. The curing agent is provided as a powdered latent curing agent mixed with a liquid epoxide resin. Polyamines used in the curing agent include diethylenetriamine and triethylenetetramine, among others. The polymeric phenols include different novolaks prepared from bisphenol A and formaldehyde, a novolak prepared from p-cresol and formaldehyde and a poly(p-vinylphenol), among others. The curing agent is activated by heating to at least about 60° C.

U.S. Pat. No. 5,107,036 teaches a curing agent for epoxy which is a combination of two phenol compounds. One phenol is a polyhydric phenol, formed from a condensation reaction of a phenol having at least one phenolic hydroxyl group with a hydroxybenzaldehyde compound. The hydroxybenzaldehyde used in the condensation reaction must have a hydroxyl group and an aldehyde group bonded to a benzene ring, which may be substituted with at least one other constituent. The other phenol is a dihydric phenol, such as catechol, resorcinol, and bisphenol A.

Mixtures of bisphenol A and an aliphatic polyamine are disclosed in U.S. Pat. No. 4,221,890. In one embodiment, butyl glycidylether is added to the mixture which may result in the conversion of some of the bisphenol A to a secondary polyol, as well as the formation of adducts of the polyamine with the monoepoxide. There is no appreciation for the exothermic nature of the reaction between bisphenol A and the polyamine. Further, there is no consideration of the use of methylol-functional hardeners for epoxy resins, either alone or in combination with other types of polyols.

Clearly, there are many uses for epoxies and epoxy systems, and so hardeners which can more rapidly cure epoxy without charring or resulting in unstable compositions are desirable and useful.

BRIEF SUMMARY OF THE INVENTION

It is an object of the present invention to provide new and useful hardener compositions for epoxies which cure over a broad range of temperatures.

It is a further object of the invention to provide hardener compositions for epoxies which cure fully and more rapidly at lower temperatures than existing hardeners.

It is a further object of the invention to provide hardener compositions for epoxies which have longer periods of latency at room temperature while retaining the ability to cure at lower temperatures than existing hardeners.

It is a further object of the invention to provide hardener compositions for epoxies which develop lower exotherm during curing than existing hardeners.

It is a further object of the invention to provide hardener compositions for epoxies which can be used without yielding noxious or harmful fumes.

Accordingly, three classes of new epoxy hardeners which have increasing cure temperatures are provided. The Class I epoxy hardeners cure at temperatures between about 20–50° C., Class II hardeners cure between about 60–100° C. and Class III hardeners cure at about 120° C. Class I hardeners contain a mixture of polyols, polyamines and tertiary amines, while Class II hardeners have the same polyols mixed with one or more tertiary amines. Class III hardeners contain the same polyols combined with either imidazole or dicyandiamide and optionally, a tertiary amine.

Polyols which are used to form each of the different classes of epoxy hardeners are classed into two groups: group A consisting of polyols with phenolic hydroxy groups, secondary alcohols or combinations thereof, and group B consisting of polyols having methylol functional groups, secondary alcohols or combinations thereof. Epoxy hardener compositions according to the invention will contain one or more polyol from group A and one or more polyol from group B with the other elements required by the. class of hardener being created.

A particular group of hardeners is provided within the Class II hardeners which has a latency of about 24 hours and cures at a temperature of only about 60° C. The hardener combines imidazole, tetramethylguanidine and trimethylolpropane in molar ratios from 2:1:1 to 1:2:1, depending on the cure rate or latency period desired. Accelerators can be added as well to decrease the cure time.

A second Class II hardener with particularly useful properties combines 1 mol each of 2,6-bis(hydroxymethyl)-p-cresol, tetramethylguanidine and trimethylolpropane. The resulting hardener cures relatively quickly at temperatures between 60–65° C. and provides good qualities to a hardened epoxy.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which a preferred embodiment of the invention is set forth.

DETAILED DESCRIPTION OF THE INVENTION

Definitions

In the description of the invention, the following standard notation and definitions are used.

The notation A.B means a mixture of A and B in 1:1 molar ratio and assumed to have intermolecular bonding forces which results in a particular physical form of the product such as a medium viscosity liquid or a low melting crystalline solid. These are also known as molecular complexes.

The notation xA.yB means a mixture of A and B in molar ratio x:y.

The notation A/B means an adduct or a product produced by the chemical reaction of A and B regardless whether the reaction is addition or condensation. The nature of the reaction will be understood by a reader having ordinary knowledge of chemistry.

The notation "phr" means parts per hundred resin.

Cure times are expressed as cure temperature in degrees Celsius over a time period as ° C./hour.

"Polyol" is defined as a material having at least two reactive groups consisting of phenol, methylol or secondary alcohol and combinations of these. The polyols used in the hardeners are defined more particularly below.

"Polyamine" is defined as an amine chosen from one of ethylenediamine, diethylenetriamine, triethylenetetramine and tetraethylenepentamine.

"Tertiary amine" is defined as a material having at least one tertiary nitrogen atom and may contain in addition, one or more reactive hydrogen atoms in the form of a phenol, secondary alcohol, secondary amine or primary amine. If there are no active hydrogens, the tertiary amine is an external plasticizer. If there are one or two active hydrogens, the tertiary amine is generally an internal plasticizer.

The following abbreviations are used to indicate the identified chemical composition:

| Abbreviation | Chemical |
| --- | --- |
| BDMA | dimethylbenzylamine |
| BGE | butylglycidylether |
| BHMC | 2,6-bis(hydroxymethyl)-p-cresol |
| BPA | bisphenol A |
| BPS | bisphenol S; 4,4'-sulfonyldiphenol |
| CAT | catechol or pyrocatechol |
| DELA | diethanolamine |
| DEAPA | N,N diethyl-3-aminopropylamine |
| DETA | diethylenetriamine |
| DIPA | diisopropanolamine |
| EDA | ethylenediamine |
| DGEBA | diglycidylether-bisphenol A |
| HQ | hydroquinone |
| Im | imidazole |
| PC | p-cresol |
| ROL | resorcinal |
| TDP | 4,4'-thiodiphenol |
| TETA | triethylenetetramine |
| TMG | tetramethylguanidine |
| TMP | trimethylolpropane |

Overview

Hardeners for epoxy resins are provided which have the capability of curing at lower temperatures and shorter times and with lower exotherm than existing hardeners. They are easily handled liquid materials having a range of viscosities thus allowing wide latitude in formulating. They are made from cheap and readily available industrial chemicals, have low odor, are easily handled and non-reactive when exposed to the atmosphere. Curing reactions with epoxy resins exhibit low exotherm and give cured products having low cure shrinkage, high tensile strength and high toughness.

Hardeners

The hardeners in accordance with the invention are broken down into three classes according to the temperature required to give complete curing: I) about 20–50° C., II) about 60–100° C. and III) 120° C. and higher.

Class I hardeners cure an epoxy, such as Shell EPON828 epoxy, at room temperature and give pot lives ranging from ¼ hour to 4 hours at 20° C. depending on the application, although at least one system according to the invention requires a 50° C. postcure for complete curing. The Class I hardeners consist of mixtures of various novel polyols mixed with polyamines and optionally, tertiary amines.

Class II hardeners consist of mixtures of these same polyols together with one or more tertiary amines. Imidazole is classified as a tertiary amine for use in Class II hardeners. Mixtures of these materials with an epoxy provide all of the advantages cited above but give pot lives (latency) at room temperature ranging from 1–10 days yet most of these systems cure fully at temperatures as low as between 60–65° C.

Class III hardeners consist of the polyols combined together with either imidazole or dicyandiamide and, in some cases a tertiary amine. When imidazole is used, rapid curing systems are obtained which are suitable for reaction injection molding at 120° C. or, with a slight modification, thermoset injection molding. The systems based on dicyandiamide provide very long pot lives at room temperature (latency) while curing rapidly at 120° C. and are suitable for film adhesive applications.

Epoxy hardener compositions according to the invention contain one or more polyol from group A and one or more polyol from group B in addition to the other elements required by the class of hardener being. created. Alternatively, the hardener compositions contain one or more polyols from group B only, with the other elements required by the particular class of hardener. The two groups of polyols preferred for use with the class I, II and III hardeners are listed below:

Group A: 1) bisphenols (ex. bisphenol A or thiodiphenol); 2) dihydric phenols (ex. catechol or resorcinol); 3) adduct of a bisphenol with 1–2 moles of a monoglycidyl compound; 4) adduct of a dihydric phenol with 1–2 moles of a monoglycidyl compound; 5) adduct of a diglycidyl compound with 2 moles of a dihydric phenol; 6) adduct of trimethylolpropane (TMP) with 2 moles of a monoglycidyl compound (remaining methylol is non-reactive with epoxy under normal curing conditions); 7) adduct of a 4-alkyl phenol with 1 mole diethanolamine and one mole formaldehyde; 8) adduct of a 4-alkyl phenol with 1 mole N,N(diethylamino)-3-propylamine and one mole formaldehyde.

Group B: 1) trimethylolpropane(TMP); 2) adduct of trimethylolpropane with 1 mole of a monoglycidyl compound; 3) adduct of a bisphenol with 2 moles of trimethylolpropane (ring substitution); 4) adduct of a dihydric phenol with 1–3 moles of trimethylolpropane (ring substitution); 5) adduct of 0-cresyl glycidylether with 2 moles of trimethylolpropane (one ring substitution, one epoxy reaction); 6) adduct formed by first reacting trimethylolpropane with 2 moles of 0-cresyl glycidylether (removes epoxy groups) followed by reacting additional 2 moles of trimethylolpropane (ring substitution); 7) adduct of a diglycidyl compound with 2 moles of a monohydric phenol capable of ring substitution, followed by reaction with 2 moles of trimethylolpropane; 8) adduct of a monoglycidyl compound with 1 mole of a monohydric phenol capable of ring substitution followed by reacting 1 mole of trimethylolpropane; 9) trihydric compound formed by reacting a 4-alkyl phenol with 2 moles of formaldehyde to produce methylol groups at the 2- and 6-positions.

Although some of the compounds in the two groups A and B contain more than two hydroxyl groups, only two hydroxyl groups are reactive with an epoxy under the curing conditions for the hardener compositions, due to either steric effects or chelation. The last two items in group A are special items which contain only one active phenolic hydroxyl group, and they are included here for convenience.

The compounds in each list vary widely in viscosity and molecular weight, which provides for a broad range of hardener compositions in each class. Higher molecular weight polyols are effective tougheners for epoxies and are resinous solids or semi-solids of high viscosity, while lower molecular weight polyols are usually either low melting point crystalline solids or low to medium viscosity liquids. Both types of lower molecular weight polyols are effective reactive diluents for the higher weight polyols, which provides for control of the viscosity of the mixtures of polyols, polyamines and epoxy resin.

The polyamines used in the hardeners are selected from the group consisting of ethylenediamine, diethylenetriamine, triethylenetetramine and tetraethylenepentamine. Tertiary amines of the invention include materials having at least one tertiary nitrogen atom and many contain one or more reactive hydrogen atoms in the form of a phenol, secondary alcohol, secondary amine or primary amine. Tertiary amines without an active hydrogen are considered external plasticizers, while those with one or two active hydrogens are generally internal plasticizers.

Mixtures of the previously described polyamine or tertiary amine, Group A polyol and Group B polyol are generally easily handled, stable liquids which have all of the desirable characteristics previously described provided some simple rules for determining relative proportions are observed:

a) As a starting point, one molecule of polyamine or tertiary amine should be provided for each phenolic hydroxyl group.

b) No less than one molecule of polyamine or tertiary amine should be provided for each molecule of TMP or mono-substituted TMP.

c) One molecule of polyamine or tertiary amine should be provided for each secondary hydroxyl group.

Examples of the foregoing are as follows: BPA.2DETA, (BPA.2TMP).4DETA, (TMP/BGE).2DETA, and (ROL/2TMP).2DETA. It should be noted that the phenolic hydroxyl groups of ROL/2TMP are non-reactive with epoxy.

Moderate increases in the proportion of polyamine or tertiary amine do not result in major changes in cure rates or properties of the cured epoxy. For Class I hardeners, decreasing the proportion of polyamine may result in incomplete curing for some systems. If the concentration of polyamine is reduced to the 50% stoichiometric level, addition of an effective tertiary amine may be required to achieve satisfactory room temperature cures.

The relative proportions of Group A and Group B polyols influence the cure rate and the mechanical properties of the cured epoxy. The high molecular weight polyols in these groups should be used at concentrations of at least 5–10 phr in order to achieve significant improvements in strength and toughness. The lower molecular weight polyols are used as reactive diluents to control mixture viscosity as well as to provide low viscosity mixtures for casting and potting applications when used as the sole polyol component. In general, the higher molecular weight polyols cure more slowly than those of low molecular weight. Cure rate is also influenced by the nature of the hydroxyl groups. Cure rate decreases in the order; phenolic hydroxyl>methylol>secondary alcohol.

Determination of the theoretical, hardener concentration in the epoxy (phr) is a relatively simple procedure. First, the total molecular weight of the hardener complex is determined. Second, the total number of functional groups (n) is added up. All of the polyols with the exception of items 7 and 8 of Group A are effectively difunctional. Third, the total molecular weight is divided by the total number of functional groups which is then divided by the epoxy equivalent weight which for EPON828 epoxy is 190. The result, when multiplied by 100 gives the hardener concentration in phr. As an example, consider BPA.2TMP.4DETA:

m.w.=228.29+2*134.18+4*103.17=909.33;

Mixtures of the previously described polyamine or tertiary amine, Group A polyol and Group B polyol are generally easily handled, stable liquids which have all of the desirable characteristics previously described provided some simple rules for determining relative proportions are observed:

a) As a starting point, one molecule of polyamine or tertiary amine should be provided for each phenolic hydroxyl group.

b) No less than one molecule of polyamine or tertiary amine should be provided for each molecule of TMP or mono-substituted TMP.

c) One molecule of polyamine or tertiary amine should be provided for each secondary hydroxyl group.

Examples of the foregoing are as follows: BPA.2DETA, (BPA.2TMP).4DETA, (TMP/BGE).2DETA, and (ROL/2TMP).2DETA. It should be noted that the phenolic hydroxyl groups of ROL/2TMP are non-reactive with epoxy.

Moderate increases in the proportion of polyamine or tertiary amine do not result in major changes in cure rates or properties of the cured epoxy. For Class I hardeners, decreasing the proportion of polyamine may result in incomplete curing for some systems. If the concentration of polyamine is reduced to the 50% stoichiometric level, addition of an effective tertiary amine may be required to achieve satisfactory room temperature cures.

The relative proportions of Group A and Group B polyols influence the cure rate and the mechanical properties of the cured epoxy. The high molecular weight polyols in these groups should be used at concentrations of at least 5–10 phr in order to achieve significant improvements in strength and toughness. The lower molecular weight polyols are used as reactive diluents to control mixture viscosity as well as to provide low viscosity mixtures for casting and potting applications when used as the sole polyol component. In general, the higher molecular weight polyols cure more slowly than those of low molecular weight. Cure rate is also influenced by the nature of the hydroxyl groups. Cure rate decreases in the order; phenolic hydroxyl>methylol>secondary alcohol.

Determination of the theoretical hardener concentration in the epoxy (phr) is a relatively simple procedure. First, the total molecular weight of the hardener complex is determined. Second, the total number of functional groups (n) is added up. All of the polyols with the exception of items 7 and 8 of Group A are effectively difunctional. Third, the total molecular weight is divided by the total number of functional groups which is then divided by the epoxy equivalent weight which for EPON828 epoxy is 190. The result, when multiplied by 100 gives the hardener concentration in phr. As an example, consider BPA.2TMP.4DETA:

m.w.=228.29+2*134.18+4*103.17=909.33;

n=2+2*2+4*5=26; and phr=18.4.

This Value Should be Considered a Theoretical Minimum Concentration.

Optimum mechanical properties will be obtained when the theoretical minimum is increased by a factor which can range from 1.2 to greater than 2.0. This forces the polyamine to assume a lower functionality than the theoretical value and results in a more flexible structure with greater opportunities for hydrogen bonding. The ultimate glass transition temperature of the cured polymer will also be reduced. As a general principle, the best mechanical properties will be obtained when the glass transition temperature actually obtained by the selected cure schedule is close to the ultimate glass transition temperature (that obtained by curing at elevated temperature for an extended time). It is generally agreed that glass transition temperatures are limited to about 45° C. above the cure temperature.

The optimum hardener concentration should be determined by testing. The mechanical properties of the cured epoxy are remarkably insensitive to excessive hardener concentrations. In tests where 2½ to 3 times the theoretical hardener concentration was used, unreacted hardener was exuded from the cured epoxy, appearing as a tacky, resinous surface film which could be easily removed by wiping with a damp cloth, while the strength and toughness of the cured epoxy were still quite good.

When a polyamine or tertiary amine is combined with a polyol under appropriate conditions, an exothermic reaction occurs with the formation of a molecular complex. The amount of heat released decreases in the order phenolic hydroxyl>methylol>secondary alcohol. When the complex is subsequently cured with an epoxy resin, a rapid reaction occurs which involves the decomposition of the complex, mutual catalysis of the reactions between the epoxy and amine and also between the epoxy and the polyol and release of heat as a result of these epoxy reactions. Some of this heat is absorbed by the decomposition of the complex, resulting in a lower overall exotherm and a rapid cure without "runaway exotherm", which can result in foaming, vapor evolution and even charring in conventional epoxy hardener systems.

A brief discussion of the chemicals and reactions involved with the formation of the epoxy hardener compositions of the invention follows.

Trimethylolpropane (TMP) used in the epoxy hardeners is a cheap, non-toxic, low melting point crystalline solid which is incompatible with diglycidylether of bisphenol A (DGEBA). TMP is presently used as a hardener for flexible polyurethanes. Clear solutions with DGEBA may be obtained by heating the mixture above the melting point of TMP, but the mixture becomes milky on cooling to room temperature and gross phase separation occurs on standing. TMP is unreactive with epoxy absent a suitable catalyst.

However, if a tertiary amine is added to the mixture at a temperature between 50–90° C., the mixture clears rapidly and cures to a clear, colorless solid having a low glass transition temperature of about 90° C., depending on the concentration of TMP. Testing indicates that only two of the three methylol groups are reactive with epoxy, probably due to the formation of a strongly bonded chelate structure between the remaining methylol and either of the two adjacent ether groups. Other experiments have shown that very high glass transitions can be achieved by curing at 120° C. in the presence of a good catalyst such as imidazole, but the cured material is very hard and brittle.

TMP is also reactive with phenyl ring hydrogen, given a suitable catalyst, either acid or base. This reaction is relatively slow compared to the reaction of TMP with epoxy groups and occurs at a higher temperature. These two reactions of TMP allow the preparation of the long chain polyols in group B which have unique properties as epoxy hardeners/tougheners leading to excellent strength and toughness of the cured epoxy, while providing rapid rates of curing at low temperatures.

Polyamines and tertiary amines form complexes with phenolic hydroxyls, methylols and secondary alcohols, the bond strength and degree of exotherm resulting from these reactions decreasing in the order phenolic hydroxyl>methylol>secondary alcohol. When the polyol contains more than one type of hydroxyl group, rapid and complete reaction between the epoxy and the polyol can be assured if the hydroxyl group which forms the strongest intermolecular bond with the amine is placed at the ends of the polyol, thus ensuring that the polyamine or tertiary amine will be located at the same positions. For example, a polyol containing two terminal methylol groups and one or more interior secondary alcohols will react first at the terminal groups and secondarily at the interior hydroxyl groups only if there are available epoxy groups remaining and the structure has not become too rigid at the selected cure temperature. If a sufficiently high concentration of polyol containing internal secondary hydroxyl groups is used, these internal groups will not react with the epoxy.

Methylols and secondary alcohols are latent with epoxy resins in the absence of a suitable catalyst. Extended latency at room temperature is a highly desirable property for many applications, such as adhesive bonding, casting and potting. Using methylols and secondary alcohols together with a latent catalyst, such as a blocked tertiary amine or an insoluble amine which dissolves at the cure temperature, useful latent formulations can be obtained.

Bisphenol A is not latent with epoxy resins but it is readily converted to a latent form by reacting it with two moles of TMP via ring substitution in the 2- and 2'- positions. For example, a mixture of Shell EPON828 epoxy and the adduct of bisphenol A with two moles of TMP was heated to 100° C. for 24 hours with no detectable increase in viscosity. Similarly, resorcinol can be converted to a latent form by reacting it with two to three moles of TMP via ring substitution primarily in the 2-, 4- and 6- positions. This material is also a good solvent for dicyandiamide as well as other polar materials.

EXAMPLES

The following examples illustrate the preparation and use of the novel polyols for each class of hardener.

Example I.1

Preparation of TMP/BGE 6.42 g TMP, 6.80 g BGE (epoxy equivalent weight 140) and 0.26 g BDMA (2 pph) were loaded into a 250 ml boiling flask together with a magnetic stir bar and a water condenser was attached. The flask was placed in a heating mantle and the assembly placed on a stir plate. The mantle was heated by means of a variable transformer set at 30%. After heating for 20 min., the temperature was 150° C. The product was a medium amber liquid. The BDMA catalyst remained as part of the product.

Example I.2

Preparation of BPA.2TMP 6.50 g BPA and 8.03 g TMP (5% excess) were placed in a 100 ml beaker with a magnetic stir bar and the beaker was placed on a stirring hot plate at a surface temperature of 150° C. After 15 minutes, BPA was entirely dissolved at a temperature of 127° C. The product was a colorless, medium viscosity liquid which crystallizes slowly over a period of several days if left undisturbed.

Example I.3

Preparation of BPA.2TMP.2DETA

BPA.2TMP produced as above was warmed in a beaker on a stirring hot plate and the theoretical weight of DETA was added slowly with stirring. The product was a nearly colorless, medium-low viscosity liquid having almost no amine odor (warm).

Example I.4

Preparation of ROL/2TMP 5.01 g ROL and 12.22 g TMP were placed in a 250 ml boiling flask together with a magnetic stir bar, a water condenser was attached and the flask was placed in a heating mantle powered by a variable voltage supply. The assembly was placed on a stir plate and heated. A clear solution was obtained after 35 min. when 0.17 g (1 pph) TMG (a strong base) was added. The temperature was 95° C. and the liquid had a greenish tint. After 1 hour and 10 minutes and a maximum temperature of 111° C., the product was a deep blue, resinous liquid. The dried product contains 1 pph TMG.

Example I.5

Preparation of DGEBA/2CAT 3 g EPON828 epoxy and 1.75 g catechol were placed in a 50 ml beaker and placed on a hot plate at a surface temperature of 90–95° C. A clear solution was obtained in 5 minutes. After one hour, 0.5 pph TMG was added and heating continued for 30 minutes more. The product was a colorless, resinous semi-solid.

Example I.6

Test Sample

The following were mixed in sequence:
1. 5 g EPON828 epoxy
2. 10 phr TMP/BGE
3. 10 phr DETA After curing for 69 days at temperatures ranging from 20–30° C., the Tg as measured by thermomechanical analysis was 72° C. After a 50° C./30 minute postcure, the Tg increased to 78° C.

Example I.7

Test Sample 5 g EPON828 epoxy was mixed with 30 phr BPA.2TMP.2DETA. After curing 2 hours/30° C. followed by 2 days/20° C., the Tg was 60° C. After a 50° C./30 minute postcure, the Tg increased to 79° C. An additional 120° C./10 minute postcure, further increased the Tg to 85° C.

Example I.8

Test Sample 3.6 g EPON828 epoxy was mixed with 30 phr BPA.2TMP.4DETA. After curing for 30° C./3 hours and 12 days at room temperature, the Tg was 66° C. After a brief exposure to 100° C. in the thermomechanical analyzer, the Tg increased to 93° C.

Example I.9

Test Sample 40 phr (EPON828 epoxy/2 CAT).2(TMP/BGE).4DETA was mixed with 5 g EPON828 epoxy and cured at 30° C. for 2½ hours followed by 2 days at room temperature. The cured material was very strong and flexible and had a Tg of 69° C.

Example I.10

Test Sample 5 g EPON828 epoxy was mixed with 20 phr BPA.2(TMP/BGE) and 10 phr DETA. The hardener components were blended before addition to the epoxy resin. After curing for 1 hour at 30° C., the mixture had set to a tacky solid, dentable with a spatula. After curing for 71 days at room temperature, the Tg was found to be 75° C. On postcuring at 50° C. for ½ hour, the Tg increased to 83° C.

Example I.11

Test Sample 5 g EPON828 epoxy was blended with a mixture of 10 phr TMP/BGE and 10 phr DETA. After curing for 1 hour at 30° C., the mixture was a tacky semi-solid. After curing for 71 days at room temperature, the Tg was found to be 72° C. On postcuring at 50° C. for ½ hour, the Tg increased to 78° C.

Example I.12

Test Sample 5 g EPON828 epoxy was blended with 40 phr of the mixture (DGEBA/2CAT).2(TMP/BGE).4DETA. A straightforward conversion from molar ratios to weight ratios gives 15.4 phr DGEBA/2CAT, 14.0 phr TMP/BGE and 10.6 phr DETA. After heating for 1 hour at 30° C. the mixture was a tacky, dentable solid. After 2 days at room temperature, the Tg was 69° C. The cured sample was strong and tough.

Example I.13

Preparation of CAT/BGE 8.04 g butyl glycidylether (epoxy equivalent weight 137) and 6.43 g catechol were loaded into a 250 ml boiling flask equipped with a water condenser and a stir bar. This mixture was heated to 63° C. at which point 1 phr TMG (tetramethylguanidine) was added and heating continued. This was heated to a maximum temperature of 110° C. with stirring over a period of one hour. The product was a dark amber liquid containing 1 phr TMG.

Example I.14

Test Sample

For this hardener, a composition equal to that of Example I.11 was combined with 10 phr 2CGE/3TMP. After curing for 1 hour at 30° C., the mixture was a tacky semi-solid. After 7½ hours at 30° C. the sample was hard and tack-free. After an additional 6 days at room temperature, the Tg was found to be 68° C. After postcuring at 65° C. for 1 hour, the Tg increased to 80° C.

Example I.15

Test Sample

This sample contained the same hardener composition as Example I.11 except that 10 phr DETA was replaced by 7.2 phr EDA (ethylenediamine). As with all similar hardener compositions, the hardener mixture was essentially odorless. After processing at the same 30°/20 ° C. cure schedule as Example I.14, the Tg was found to be 66° C. After postcuring at 65° C. for 1 hour, the Tg increased to 75° C. The cure rate was practically identical to that of Example I.14.

Example I.16

Test Sample 5 g EPON828 epoxy was blended with 27 phr (ROL/2TMP).2 TMP.4DETA. The equivalent concentrations by weight were 9.0 phr ROL/2TMP, 7.1 phr TMP and 10.9 phr DETA. After curing for 1 hour at 30° C., the sample was a tacky, dentable solid. After curing for an additional 71 days at room temperature, the Tg was 84° C.

Example I.17

Test Sample 5 g EPON828 epoxy was blended with 28 phr (CAT/BGE).2DETA and cured at 30° C. After 45 minutes, the sample was a tacky semi-solid. After 65 days at room temperature, the Tg was found to be 78° C. The cured sample was strong and tough which appears to be typical of samples containing CAT/BGE despite the small size of this molecule.

Example I.18

Test Sample 5 g EPON828 epoxy were blended with a mixture of 5 phr CAT/BGE and 14 phr DETA. The cure rate at 30° C. was about the same as the previous sample. After curing at room temperature for 65 days, the sample was very strong and tough and gave a Tg of 86° C.

Example I.19

Preparation of 2TMP/CGE

O-cresyl glycidylether is marketed commercially in a technical grade containing 90% CGE. The balance is assumed to be the adduct of CGE with o-cresol. To prepare 2TMP/CGE, the epoxy-functional component is first reacted with one mole TMP, using a basic catalyst such as BDMA or TMG. Each of the cresyl groups is then reacted with one mole TMP (ring substitution) which requires one mole TMP for 90% of the product and two moles TMP for 10% of the product. To minimize oligomer formation, all of the TMP is added at the beginning. A catalyst concentration of 1 pph and 4 hours at 130° C. were sufficient to complete the reactions. The product is a pale amber, viscous liquid.

Example II.1

Test Sample 5 g EPON828 epoxy was mixed with 10 phr BHM-C.TMG. The mixture remained flexible and tacky for 2 days at room temperature, latency sufficient for film adhesive applications. After curing at 65° C./3 hours, the Tg was 109° C.

Example II.2

Test Sample 5 g EPON828 epoxy was mixed with 13.5 phr (PC/DEAPA).2TMP. The mixture remained flexible and tacky for 5–6 days at room temperature. The sample was gelled in one hour at 65° C. and cured 1 hour/80° C. giving a Tg of 115° C.

Example II.3

Test Sample 0.7 g BDMA.DELA.TMP was mixed with 1.0 g TMP while warming the mixture on a hot plate. The product was a viscous, colorless liquid at room temperature. This was then mixed with 5 g EPON828 epoxy resin. The mixture was a milky white emulsion of medium viscosity at room temperature. The sample was placed in an oven at 65° C. After ten minutes the sample was clear, colorless and of medium viscosity. After one hour, the sample was a tacky semi-solid. After curing at 65° C. for 3 hours, the Tg was 90° C. The cured material was very strong and tough and the absence of color suggests applications to optical adhesives.

Example II.4

Test Sample 5 g EPON828 epoxy was blended with 10 phr BHM-C.TMG and maintained at room temperature. After 5 days, the sample was a slightly flexible, tacky solid. Upon heating to 65° C., it melted to a viscous liquid and was cured for 2½ hours at this temperature. The Tg was 109° C.

Example II.5

Test Sample 5 g EPON828 epoxy was blended with 10 phr BHMC.TMG.TMP and cured 3½ hours at 65° C. The Tg was 99° C. and the sample was very strong and tough.

Example II.6

Test Sample 5 g EPON828 epoxy was blended with a hardener mixture of 20 phr BPA/2BGE and 5 phr MPZ (1-methyl piperazine). After curing 1 hour at 65° C. the Tg was 90° C. A second sample using 20 phr TDP/2BGE instead of BPA/2BGE gave identical results.

Example II.7

Test Sample 5 g EPON828 epoxy was blended with a hardener mixture containing 20 phr CAT/BGE, 5 phr BDMA and 4 phr DELA and left at room:temperature. After 4 days, the mixture remained a viscous liquid, exhibiting excellent latency. After heating for 1½ hours at 50° C., the sample remained a very viscous liquid. After curing for 1 hour additional at 65° C., the sample was hard, tack-free, strong and gave a Tg of 98° C.

Example II.8

Preparation of Im.TMG.TMP

The hardener composition Im.TMG.TMP is produced by first heating a mixture of 1 mol each imidazole (Im) and trimethylolpropane (TMP) until a liquid melt is obtained. The mixture of Im and TMP is a eutectic composition having a relatively low melting point. The mixture is then cooled to about 50° C. and 1 mol TMG is added while stirring until all components are thoroughly mixed. The mixture remains stable as a liquid to temperatures as low as 5° C.

Example II.9

Preparation of TMGA 15.58 g of EPON862 (diglycidylether of bisphenol F) and 10.50 g of TMG (0.6% excess) were weighed into a 3-neck, 250 ml flask equipped with a water condenser, stir bar and temperature probe. The mixture was heated to 100° C. over 20 minutes and held at 100° C. for one hour. The resulting product was a viscous resin.

Example II.10

Test Sample

A hardener mixture comprising 8.6 phr 2Im.TMGA.2TMP+2 phr EMI was prepared and blended with 5 g of EPON828 epoxy resin. The sample was cured at 60° C./4 hours and the cured material was hard, strong and tough. The latency period was 24 hours at room temperature.

Example II.11

Test Samples 15 phr of the hardener BHMC.TMG.TMP were blended with 5 g of EPON828 epoxy resin and the sample mixture was cured at 60° C. Examination of the epoxy-hardener mixture showed that the sample was cured after 2 hours. The resulting cured composition was strong and tough. The sample had an observed latency period of 24 hours at room temperature.

A second sample of 10 phr BHMC.TMG.TMP was prepared using EPON828 epoxy resin. The second sample was observed and judged as being fully cured after curing at 60°/4 hours. The latency period of the second sample was observed to be about 48 hours at room temperature.

Example III.1

Test Sample 5 g EPON828 epoxy was mixed with 3 phr Im.TMG and 5 phr TMP/BGE. The two hardener components were mixed before adding the epoxy. The mixture was gelled after one hour at 75° C. and cured at 120° C./1 hour. The Tg was 153° C. The cured resin was very hard, strong and brittle.

Example III.2

Test Sample 5 g EPON828 epoxy was mixed with (10 phr BPA.2TMP+1.2 phr Im). After heating at 60° C./30 minutes followed by 80° C./30 minutes the sample was a rubbery solid (hot). After curing at 120° C. for 1 hour the Tg was 137° C.

Example III.3

Test Sample 5 g EPON828 epoxy was mixed with (30 phr BPA.2TMP+1.2 phr Im). After heating at 50° C./1 hour followed by 80° C./1 hour, the sample was semi-solid (hot). After curing at 120° C./2 hours the Tg was 86° C.

Example III.4

Test Sample

This sample was designed to have extended latency at room temperature for film adhesive applications with freezer storage and very long "out time" while providing complete curing at 120° C. and good properties of the cured resin. The basic concept is to utilize dicyandiamide (DICY) as the "amine" component of the hardener mixture in the form of a fine suspension in the epoxy resin, in which it is insoluble. DICY normally becomes active only at temperatures above 150° C. An additional hardener component is provided in the form of a mixture of polyols which are unreactive with the epoxy under storage conditions absent soluble DICY and which, when heated to 100–120° C. cause DICY to go into solution, followed by curing reactions of all of the components. It has been found that a mixture of ROL/2TMP and PC/DELA has the desired properties for the polyol solvent component of the hardener and that the correct proportions are: (ROL/2TMP).2(PC/DELA).2DICY.

As previously described, DICY is first milled into the epoxy resin and the polyol mixture, which is a liquid, is then added to the epoxy+DICY mixture at room temperature.

5 g EPON828 epoxy were blended with 5.9 phr DICY (insoluble powder) and a mixture of 12 phr ROL/2 TMP and 15.8 phr PC/DELA was then added. The mixture was an opaque, gray-green slurry. When heated to 107° C. for 15 minutes, there was no change, but when the temperature was increased to 120° C. the mixture abruptly cleared, turned amber and increased rapidly in viscosity. After curing at 120° C. for 1 hour, the Tg was 104° C. The use of an epoxy of higher functionality than EPON828 epoxy would provide higher Tg values.

Reaction Exotherm Characteristics

The three classes of epoxy hardeners described herein are molecular complexes consisting of combinations of amines and polyols as defined above. The polyol molecules are designed so that in most cases the most reactive (most acidic) hydroxyl groups are located at the ends of the molecule. Because of complex formation with amines, the amines are also located at the end points of the polyol molecules. Due to mutual catalysis, this results in rapid reaction of the hardener with the epoxy at lower temperatures than with conventional hardeners and a very rapid buildup of molecular weight of the polymer.

The low exotherm characteristics of these epoxy hardeners requires a more detailed explanation. If A is an amine and B is a polyol and A and B are mixed, an exothermic reaction occurs with the formation of a molecular complex:

$$A+B \rightarrow A.B + \Delta H$$

where $\Delta H$ represents the heat released by the reaction.

If the complex A.B is then mixed with an epoxy E, the following sequence of reactions occurs:

$$A.B+E \rightarrow A/E+B/E+\Delta H' \Delta H$$

where A/E and B/E represent the adducts of the amine-expoy and polyol-epoxy, respectively, $\Delta H'$ is the heat released by the epoxy reactions, and $\Delta H$ is the heat of formation of the complex A.B. The overall heat released is thus reduced by the heat of formation of the complex A.B.

If, instead of forming the hardener complex A.B first, the polyol B is mixed with the epoxy and the amine A is then added in sequence, the following reactions occur:

$$(B+E)+A \rightarrow A.B+\Delta H+E \rightarrow A/E+B/E+\Delta H+\Delta H'-\Delta H-A/E+B/E+\Delta H'$$

A comparison of the results for direct addition of the complex to the epoxy versus sequential addition of the hardener components to the epoxy, shows that the difference in heat released for these two cases is $\Delta H$. Sequential addition of the hardener components thus results in a large heat release and a very short pot life or gel time. This is seldom an advantage except where a very fast cure of a small mass of material is desired.

For example, with one hardener system, a pot life of 30 minutes at 30° C. was obtained with a tack-free partial cure in one hour when the complex form of the hardener mixture was used. There was no noticeable exotherm. With sequential addition of the same hardener components, a tack-free partial cure was obtained in 15 minutes at 30° C. due largely to a considerable exotherm. In certain operations such as press molding where the cure rate is limited by the scorch temperature of the polymer, increased production rates can be obtained by the use of these hardener complexes.

Sequential addition of hardener components containing different polyols can result in unexpected exotherms. For example, ROL/2TMP is considerably more acidic than BPA. If ROL/2TMP is first mixed with the epoxy resin and BPA.2DETA is then added sequentially to the mixture, an exothermic reaction will occur with the formation of (ROL/2TMP).xDETA. As a rule, sequential addition of hardener components must be carefully considered.

It is generally understood in the chemical arts that trimethylolpropane (TMP) will react chemically with a primary amine in the presence of a catalyst and an elevated temperature. However, there is no information concerning the progress of this reaction at room temperature and in the absence of the catalyst. Since this question is of critical importance to the stability and effectiveness as epoxy hardeners of mixtures of TMP or TMP-derivatives and polyamines, a practical test was designed to answer this question. The test and the results are described below.

A hardener mixture consisting of a 1:1 molar ratio mixture of trimethylolpropane (TMP) and diethylenetriamine (DETA) was prepared. TMP and DETA were weighed into a small beaker and warmed slightly at 50–60° C. on a hot plate until the TMP was completely dissolved. Heat was given off as the TMP dissolved. There was only a barely detectable amine odor of the warm solution. As soon as the mixture had cooled to room temperature, a sample was prepared containing 5 g of Shell EPON828 epoxy and 21 phr of the hardener mixture. The sample was placed in an air-circulating oven at 30° C. and the physical properties of the sample recorded at 30 minute intervals as curing progressed. The remainder of the hardener sample was placed in a glass vial, tightly stoppered and stored at room temperature.

After 293 days at room temperature, the hardener sample was retrieved and a second epoxy sample was prepared which was identical to the first and cured under the same conditions. The results of the cure test were identical. It can be concluded that no substantial chemical change occurred in the hardener sample during the intervening period of storage at room temperature and most importantly, that there was no loss of effectiveness of the hardener mixture as a result of the prolonged storage at room temperature.

However, trimethylolpropane (TMP) does react with phenyl ring hydrogen and some of the polyols described herein contain phenyl groups. This reaction is catalyzed by either acid or base, including amines. For example, a mixture of resorcinol (ROL) and TMP reacts slowly at room temperature over a period of months without a catalyst to produce a partially substituted product ROL/xTMP. The reaction does not go to completion under these conditions. Other phenols and bisphenols also react similarly but at much lower rates.

Experiments utilizing the adducts of a number of phenols and bisphenols with TMP which were prepared using an appropriate catalyst at elevated temperature have shown that the adducts are superior to the phenols themselves as components of these epoxy hardeners. They are latent with epoxy absent a catalyst, they react more readily with epoxy at temperatures below 50° C. when properly catalyzed and the mechanical properties of the cured polymer are better, due perhaps to the more flexible terminal structure of the polyols. In these situations, it appears that the phenolic hydroxyl groups do not react with the epoxy since TMP substitutes in the ortho position and the phenolic hydroxyls have poor availability as a result.

It is believed that a small amount of TMP or TMP-substituted material reacts with phenyl ring hydrogen during the cure of an epoxy at low temperature. Some of the Tg values obtained after low temperature curing are unusually high if the properties are assumed to result from the consumption of epoxy groups only. If so, this constitutes an additional curing mechanism which may proceed concurrently with the epoxy reactions.

A particularly useful Class II hardener composition uses TMG as one of the amine components. A hardener comprised of imidazole, TMG and TMP in molar ratios from 2:1:1 to 1:2:1, such as described in Example II.8, above, has extremely long latency, with a cure temperature of between about 60–65° C. The hardener can cure in about 4 hours. An epoxy hardener of this type with long latency is particularly useful in the aircraft production industry, where long latency periods and low temperature curing are necessary so that workers have sufficient time to bond complex assemblies while maintaining low levels of residual stress in the cured structures.

One reason for the particularly good latency characteristics exhibited by epoxies cured using the Im.TMG.TMP hardener is the unexpected strength of the nitrogen-nitrogen bonds between the imidazole and tetramethylguanadine. The bond strength results from the combination of TMG as a strong base with Im, which is a medium base, and therefore slightly acidic relative to TMG. The high polarity of imidazole is also a factor.

As noted, this hardener, Im.TMG.TMP, is a Class II hardener and a triple complex. Preferably, the hardener is made using a molar ratio of 1:1:1, but other ratios within the described range are acceptable. Variations of the molar ratio will affect the cure rate and/or latency period, and can be adjusted to suit a particular need.

Further, accelerators such as phenolic hardeners PC/DELA or PC/DEAPA (Group A, #7 and #8) can be added to the hardener to increase the cure rate. Although PC/DELA and PC/DEAPA are preferred, any of the Group A or B phenolic compounds can be used as accelerators. The cure rate can also be increased by using a latent co-curative such as 2-ethyl-4-methylimidazole (EMI). EMI is an example of a blocked imidazole which is quite latent at low concentrations and is an effective cure accelerator at 60° C. The EMI is simply added to the Im.TMG.TMP hardener prior to combination with an epoxy. The specific concentration of the hardener used in the selected epoxy will necessarily vary according to the desired cure and latency characteristics, but is preferably determined to be at least an amount which produces a 1.0 phr imidazole concentration in the mixture.

The cure characteristics of the IM.TMG.TMP hardener and the properties of the resulting cured epoxy resin can also be modified by substituting one of the Group A compounds, such as a bisphenol like TDP or a modified dihydric phenol like CAT/BGE, ROL/BGE, for TMP, or by using the Group A compounds in combination with TMP. Using the known properties of these components to make a hardener in the manner described above, one can obtain a good range of cure characteristics, latency periods and cured epoxy characteristics.

It has been found during testing of the Im.TMG.TMP hardener system that small amounts of TMG can be lost from the epoxy-hardener mixture by evaporation during the initial stages of curing at 60° C. The evaporation of TMG can present a hazard to persons who use the hardener in other than laboratory conditions, and, as well, results in a change in the molar ratio of the components. A solution for preventing evaporation was investigated, including reacting TMG with a monoepoxide or a diepoxide, or reacting TMG with a phenol or dihydric phenol and formaldehyde to increase the molecular weight, while retaining at least one of the desired functional groups.

A preferred solution for reducing the volatility of TMG while providing the same desired function is to react 2 moles of TMG with a diglycidylether to produce a secondary diol with pendant TMG groups. The resulting compound is referred to herein as TMGA, or TMG Adduct. In particular, the diglycidylether of bisphenol F (e.g., EPON862) produces TMGA having the lowest observed viscosity.

When TMGA is substituted for TMG in the Im.T-MG.TMP hardener, the preferred hardener formula becomes 2Im.TMGA.2TMP, since TMGA has two TMG groups. The same range of molar ratios of imidazole, TMGA and trimethylolpropane can be used as with the TMG formulation. The TMGA formulation of this hardener eliminates the observed vapor problem of the TMG formulation, cures an epoxy at about 60° C. and has a slightly longer latency than the TMG formulation. The hardener using TMGA, however, provides improved mechanical properties to the resulting cured epoxy composition compared to the TMG hardener.

A further alternative to the Im.TMG.TMP formulation is a hardener formed by combining one of the polyols from Group B with TMG and TMP in a preferred molar ratio of 1:1:1. The Group B polyol preferred for the hardener is trihydric compound formed by reacting a 4-alkyl phenol with 2 moles of formaldehyde to produce methylol groups at the 2- and 6- positions. The compound referred to herein as BHMC is a most preferred example of this polyol.

A hardener having the formula BHMC.TMG.TMP has good latency, cures at 60° C. and as explained further below, reduces the problem of evaporation of the TMG during curing as well. Although TMG is ordinarily considered a sluggish hardener (see, A. E. Sherr et al., Journal of Applied Polymer Science, 9:2707 (1965)), the BHMC seems to effectively act as an accelerator and latency promoter. The complex of BHMC.TMG is an extremely viscous material, believed to result from a high degree of head-to-tail hydrogen bonding between the nitrogen atoms and methylol hydroxyl groups.

In mixtures with epoxy resin, the BHMC.TMG complex alone results in conversion of the mixture to a hard, tacky material (the "A stage") in about 3–4 days at room temperature. But, upon heating to a cure temperature of between 60–65° C., the A stage material melts to a viscous liquid and undergoes a normal cure. The false vitrification is detrimental to the use of BHMC.TMG hardener mixed with epoxy as a film adhesive or composite matrix resin due to the disappearance of desirable tack and drape properties.

However, the addition of one mole TMP to the BHMC.TMG remedies this problem. The TMP serves as a hydrogen bonded end-capper and reduces the viscosity of both the BHMC.TMG.TMP hardener and the epoxyhardener mixture to manageable levels. Although the addition of TMP reduces the potential latency of the hardener, latency is still excellent and exceeds that of the 2Im.TMGA.2TMP hardener. The BHMC.TMG.TMP hardener cures easily at 60–65° C. and provides outstanding mechanical properties to the cured epoxy. And, despite unreacted TMG being present in the hardener, the combination with a phenol (the BHMC) produces a low TMG vapor pressure so that evaporation of TMG during use of the hardener was not observed.

While specific embodiments of the invention have been shown and described in detail to illustrate the application of the principles of the invention, it will be understood that the invention may be embodied otherwise without departing from such principles.

What is claimed is:

1. An epoxy hardener composition having a cure temperature of between about 60–100° C., comprising a mixture of imidazole, trimethylolpropane and a tetramethylguanidine adduct formed as a reaction product of tetramethylguanidine and one of a monoepoxide, a diepoxide, a phenol and formaldehyde, and a dihydric phenol and formaldehyde.

2. An epoxy hardener composition according to claim 1, wherein the tetramethylguanidine adduct is a reaction product of tetramethylguanidine and a diglycidylether.

3. An epoxy hardener composition having a cure temperature of between about 60–100° C., comprising a mixture of trimethylolpropane, a trihydric compound having methylol groups at the 2- and 6- positions formed by reacting a 4-alkyl phenol with 2 moles of formaldehyde, and a tetramethylguanidine adduct formed as a reaction product of tetramethylguanidine and one of a monoepoxide, a diepoxide, a phenol, and a dihydric phenol and formaldehyde.

4. An epoxy hardener composition according to claim 3, wherein the tetramethylguanidine adduct is a reaction product of tetramethylguanidine and a diglycidylether.

5. An epoxy hardener composition according to claim 3, wherein the trihydric compound is 2,6-bis(hydroxymethyl)-p-cresol.

6. An epoxy hardener composition having a cure temperature of between about 60–100° C., a mixture of trimethylolpropane, a trihydric compound having methylol groups at the 2- and 6- positions formed by reacting a 4-alkyl phenol with 2 moles of formaldehyde, and tetramethylguanidine.

7. An epoxy hardener composition according to claim 6, wherein the trihydric compound is 2,6-bis(hydroxymethyl)-p-cresol.

* * * * *